US008561207B2

(12) United States Patent
Chinn et al.

(10) Patent No.: US 8,561,207 B2
(45) Date of Patent: Oct. 15, 2013

(54) AUTHENTICATING A MULTIPLE INTERFACE DEVICE ON AN ENUMERATED BUS

(75) Inventors: Paul William Chinn, San Jose, CA (US); Roberto G. Yepez, San Francisco, CA (US); Anand Dalal, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 242 days.

(21) Appl. No.: 12/860,841

(22) Filed: Aug. 20, 2010

(65) Prior Publication Data
US 2012/0047368 A1 Feb. 23, 2012

(51) Int. Cl.
*G06F 21/10* (2013.01)
(52) U.S. Cl.
USPC .......................... 726/27; 726/2; 726/4; 726/9
(58) Field of Classification Search
USPC .............................................. 726/27; 710/32
See application file for complete search history.

(56) References Cited

U.S. PATENT DOCUMENTS

| | | | |
|---|---|---|---|
| 6,775,558 B1* | 8/2004 | Ranta et al. .................... 455/557 |
| 7,162,407 B2* | 1/2007 | Poley et al. ....................... 703/24 |
| 7,164,690 B2* | 1/2007 | Limb et al. ..................... 370/443 |
| 7,310,821 B2* | 12/2007 | Lee et al. ......................... 726/27 |
| 7,631,126 B2 | 12/2009 | Barake et al. |
| 7,653,942 B2* | 1/2010 | Tamura et al. ................... 726/23 |
| 7,706,637 B2* | 4/2010 | Marriott ......................... 382/305 |
| 7,813,822 B1* | 10/2010 | Hoffberg ......................... 700/94 |
| 7,921,455 B2* | 4/2011 | Lin et al. ............................ 726/9 |
| 2003/0237004 A1* | 12/2003 | Okamura ....................... 713/201 |
| 2006/0059564 A1* | 3/2006 | Tan et al. .......................... 726/27 |
| 2007/0076717 A1* | 4/2007 | Limb et al. ...................... 370/390 |
| 2007/0299871 A1* | 12/2007 | Anglin et al. ................ 707/104.1 |
| 2008/0005409 A1 | 1/2008 | Kolokowsky et al. |
| 2008/0133919 A1* | 6/2008 | You et al. ....................... 713/175 |
| 2008/0178300 A1* | 7/2008 | Brown et al. .................... 726/29 |
| 2008/0189762 A1* | 8/2008 | Toriumi ............................ 726/2 |
| 2008/0250165 A1 | 10/2008 | Reynolds et al. |
| 2009/0049307 A1* | 2/2009 | Lin ................................ 713/185 |
| 2009/0055758 A1* | 2/2009 | Sim et al. ....................... 715/762 |

(Continued)

FOREIGN PATENT DOCUMENTS

EP 2136310 A1 12/2009

OTHER PUBLICATIONS

Guzik et al. "Tukan—An 8K Pulse Height Analyzer and Multi-Channel Scaler With a PCI or a USB Interface," 2006, IEEE Transactions on Nuclear Science, vol. 53, No. 1, pp. 231-235.*

(Continued)

*Primary Examiner* — Luu Pham
*Assistant Examiner* — Sanchit Sarker
(74) *Attorney, Agent, or Firm* — Kilpatrick Townsend & Stockton LLP

(57) ABSTRACT

A method for authenticating a multiple interface accessory device is provided. The method includes receiving enumeration information identifying the multiple interfaces supported by the accessory. The enumeration information includes information about a master interface supported by the accessory. A host device obtains authentication information from the accessory in accordance with a protocol associated with the master interface. Based on the authentication information, the host device determines whether the accessory is authorized to communicate with the host device. In the event that the accessory is authorized, the host device permits communication with the accessory using one or more of the multiple interfaces supported by the accessory.

19 Claims, 5 Drawing Sheets

(56) References Cited

U.S. PATENT DOCUMENTS

| | | |
|---|---|---|
| 2009/0240844 A1 | 9/2009 | Lee |
| 2009/0265722 A1* | 10/2009 | Lu et al. ........................ 719/327 |
| 2010/0017546 A1* | 1/2010 | Poo et al. ........................ 710/32 |
| 2010/0075604 A1 | 3/2010 | Lydon et al. |
| 2010/0293611 A1* | 11/2010 | Ablabutyan .................... 726/17 |
| 2010/0328689 A1* | 12/2010 | Koo et al. ...................... 358/1.9 |
| 2011/0034166 A1* | 2/2011 | Karabinis et al. ............. 455/427 |
| 2012/0023329 A1* | 1/2012 | Yamamoto et al. ........... 713/158 |

OTHER PUBLICATIONS

Haartsen "Bluetooth—The Universal Radio Interface for Ad hoc, Wireless Connectivity," 1998, Ericsson Review No. 3.*

* cited by examiner

AUTHENTICATING A MULTIPLE INTERFACE DEVICE ON AN ENUMERATED BUS

BACKGROUND

The present disclosure generally relates to portable computing devices and in particular to authenticating a multiple interface device for use with a portable computing device.

Computing devices, e.g., personal computers, have been in use for several decades. Computing devices are used for performing various tasks, from the simple to some of the most complex tasks. Computing devices can be generally categorized into portable, e.g., a laptop PC or a PDA, and non-portable, e.g., a desktop PC.

In the past decade, portable computing devices have gained popularity due to their portability and ability to manage multiple tasks. For example, a portable computing device, e.g., a personal digital assistant, can provide ability to check and respond to emails, manage meetings, display graphics and video, and play music.

A portable computing device can include one or more connectors or ports that can be used to interface with other devices. For example, the connector or port can enable the portable computing device to be inserted into a docking system, or receive an accessory device. In case of accessory devices connected via an enumerated bus connection, e.g., a USB connection, often the accessory device does not need to be authenticated prior to its use with the portable computing device.

SUMMARY

Certain embodiments of the present invention provide methods for authenticating an accessory device, such as a multiple interface device, prior to its use with a portable computing device.

An embodiment of the present invention can provide a method for enabling an accessory for use with a host device, e.g., a portable computing device. In the method, once the accessory is connected to the host device, the accessory can provide information about all the interfaces it supports. The host device can then search the provided information to check whether the accessory supports a master interface that is specifically defined for the host device. Once the host device determines that the accessory supports the master interface, it can request authentication information from the accessory. After receiving the authentication information, the host device can then validate the information to determine if the accessory is authorized for use with the host device. If the accessory is determined to be authorized, the host device can enable other interfaces/functionalities of the accessory. If the accessory does not support the master interface or is deemed to be unauthorized for use with the host device, any further communications from the accessory can be blocked and the accessory is not enabled for use with the host device.

Other embodiments of the present invention can provide a host device that can authenticate a USB accessory. Once connected, the USB accessory can enumerate all the interfaces it supports. If the host device determines that there is a master interface among the enumerated interfaces, the host device can request authentication information from the accessory via the master interface using a communication protocol designed to be used with the master interface. Once authentication is successful, one or more of the other interfaces of the USB accessory can be enabled. In some embodiments, there may be several levels of authentication and each level of authentication may be associated with a particular set of interfaces. In this instance, depending on the level of authentication, one or more interfaces of the USB device may get enabled.

An accessory designed to be used with the host device can support the master interface and the communication protocol used for performing the authentication. In some embodiments, the accessory device can include specialized hardware for use in the authentication process.

These and other embodiments of the invention along with many of its advantages and features are described in more detail in conjunction with the text below and attached figures.

DETAILED DESCRIPTION

Figure 1:
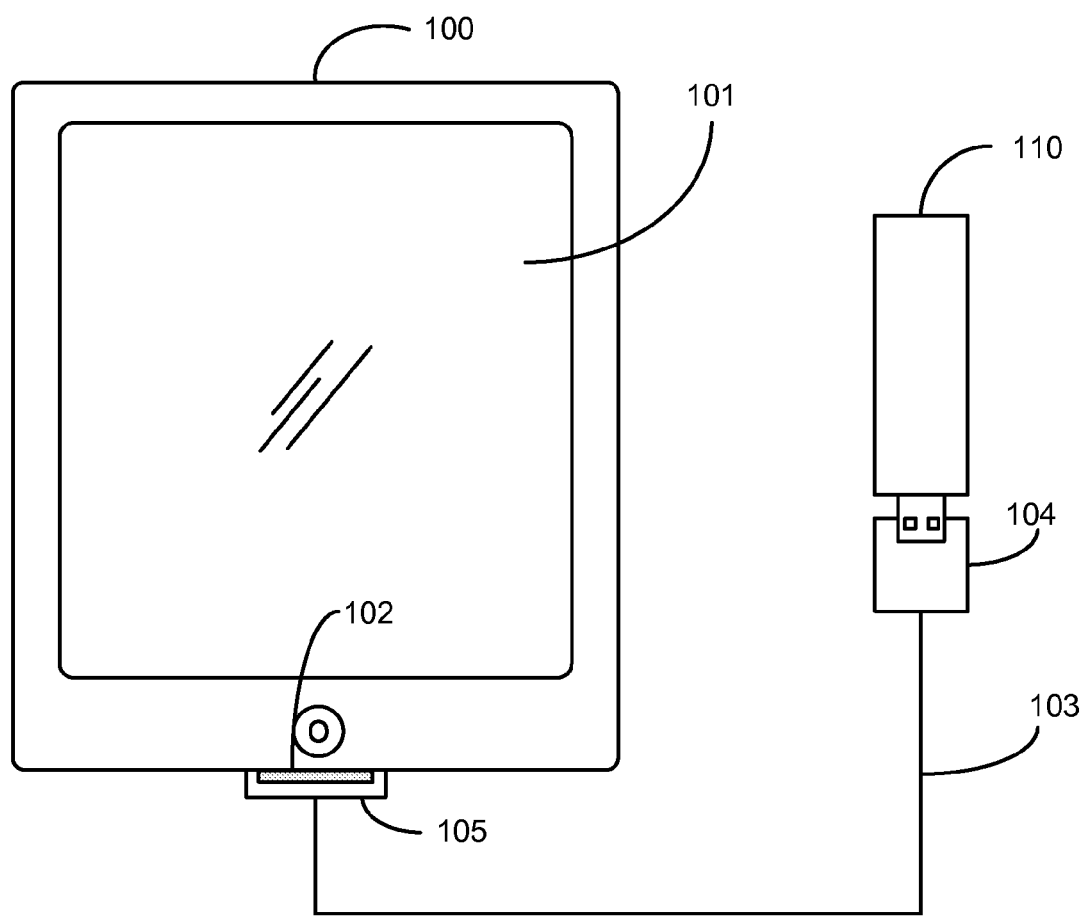
FIG. 1 illustrates a portable computing device connected to an accessory according to an embodiment of the present invention.

Some embodiments of the present invention provide a mechanism for authenticating a multiple interface device over an enumerated bus prior to its use with a portable computing device.

Accessory devices can be connected to a portable computing device, such as a PC, over several different channels or transports. For example, an accessory device can be connected to a portable computing device via a direct connection to a serial port, a parallel port, an Ethernet port, and/or a USB port. An accessory device may also be connected to a portable computing device via wireless medium such as Wi-Fi or Bluetooth. The following description primarily refers to accessory devices connected to the portable computing device via a USB connection/transport. However, one skilled in the art would readily recognize that the authentication techniques disclosed in this specification are equally applicable to other types of wired and wireless connections such as those described above.

The USB standard defines several interfaces that may be used by an accessory device to communicate with a host such as a portable computing device. Some of the interfaces specified in the USB standard are audio, human interface device (HID), physical interface device (PID), image, printer, mass storage, communications and CDC control, smart card, content security, video, personal healthcare, wireless controller, application specific, and vendor specific. An accessory device may support one or more of these interfaces depending on the functionality of the accessory device. For example, a USB flash memory device may only support the mass storage interface. On the other hand, a multi-function device such as, an iPod® made by Apple Inc. may support multiple interfaces such as audio, video, and mass storage.

Accessory devices that connect with the portable computing device via a USB connection can be either a single interface device, e.g., a USB mass storage device, or a multiple interface device, e.g., an iPod® which may include multiple interfaces such as, audio, video, mass storage, camera, etc. In the USB connection realm, there is usually a USB host device that controls the operation of the USB accessory device. For example, a USB host device can be a PC or a portable computing device and a USB accessory device can be any device that connects to the USB host device via the USB connector on the USB host device.

Conventionally, when a USB accessory device is first connected to a USB host, the USB device enumeration process is started. The enumeration starts by the USB host sending a reset signal to the USB accessory device. The data rate of the USB accessory device can be determined during the reset signaling. After reset, the USB accessory device's information can be read by the USB host and the USB accessory device can be assigned a unique 7-bit address. If the USB accessory device is supported by the USB host, the USB accessory device drivers needed for communicating with the USB accessory device can be loaded and the USB accessory device is set to a configured state. If the USB host is restarted, the enumeration process is repeated for all connected USB accessory devices.

Usually, the USB host merely verifies that the particular USB accessory device is supported by the USB host prior to loading the appropriate device drivers. There is no mechanism to authenticate the USB accessory device prior to activating the USB accessory device to be operational with the USB host device. In certain instances, unauthorized USB accessory devices can cause serious and sometimes permanent damage to the USB host device. In order to prevent such an occurrence, it may be advisable to only allow use of authorized USB accessory devices with a USB host device. However, currently there is no mechanism within the USB communication protocol for authenticating a USB accessory device prior to enumerating the various interfaces offered by the accessory device.

FIG. 1 illustrates a portable computing device (PCD) 100 connected to a USB accessory device 110 according to an embodiment of the present invention. A PCD can be any device that can perform computations, play video or music, connect to the Internet and have browsing capability, and the like. In this configuration, PCD 100 acts as the host device for the accessory device 110. As illustrated, PCD 100 can include a display 101, an accessory interface 102, an audio port (not shown), a volume control switch (not shown), and various other control inputs.

Display 101 can be a touch screen in some embodiments and be capable of displaying graphics and other information of varying resolutions. In some embodiments, display 101 can be operated using a stylus or using human touch.

Accessory I/O interface 102 can be used to connect PCD 100 to a USB accessory device or any other accessory. In some embodiments, the accessory I/O interface 102 can include a 30-pin connector corresponding to the connector used on iPod® products manufactured and sold by Apple Inc. Alternatively or additionally, accessory I/O interface 102 can include a different connector (e.g., a USB connector) and/or wireless interface (e.g., Bluetooth or the like). In some embodiments, accessory I/O interface 102 can include more than one connector. As illustrated in FIG. 1, PCD 100 can be coupled to accessory device 110 using a cable 103. However, in other embodiments, PCD 100 and accessory device 110 may be coupled via a wireless medium. In some other embodiments, PCD 100 can be coupled directly to accessory device 110 using complimentary connectors.

In some embodiments, cable 103 may have a USB connector 104 at one end and a connector 105 that is compatible with accessory I/O interface 102 at the other end. In some embodiments, connector 105 can be a 30-pin connector that can mate with the complimentary 30-pin connector on PCD 100. In other embodiments, connector 105 can be a USB connector or any other connector, e.g., firewire, that can mate with a complimentary connector on PCD 100. Of course, for wireless connections between PCD 100 and accessory 110 a cable is not needed. In some embodiments, the authorization hardware can be built into cable 103. In other embodiments, the authorization hardware is located in accessory 110.

Figure 2:
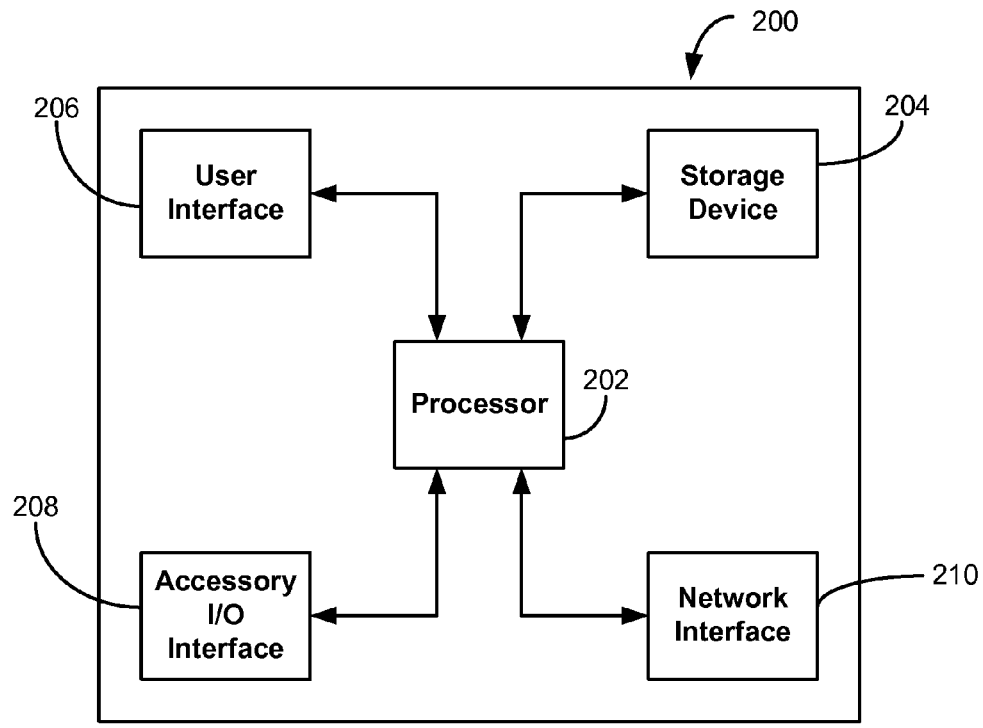
FIG. 2 is a block diagram of a portable computing device according to an embodiment of the present invention.

FIG. 2 is a block diagram of a PCD 200 according to an embodiment of the present invention (e.g., implementing PCD 100 of FIG. 1). PCD 200 can include a processor 202, a storage device 204, a user interface 206, an accessory input/output (I/O) interface 208, and a network interface 210.

Processor 202, which can be implemented as one or more integrated circuits (e.g., a conventional microprocessor or microcontroller), can control the operation of PCD 200. For example, in response to user input signals provided by user interface 206, processor 202 can communicate with an accessory connected via accessory I/O interface 208.

Storage device 204 can be implemented, e.g., using disk, flash memory, or any other nonvolatile storage medium. In some embodiments, storage device 204 can store documents, graphics, media assets, or the like, that can be manipulated by PCD 200. Storage device 204 can also store information about various accessories that can be used with PCD 200. Storage device 204 can also store other information such as scheduled appointments and events, notes, and/or other personal information. In some embodiments, storage device 204 can store one or more programs to be executed by processor 202 (e.g., video game programs, personal information management programs, image processing application, media playback programs, word processing programs, presentation applications, etc.).

User interface 206 can include input controls such as a touch screen, touch pad, scroll wheel, click wheel, dial, button, keypad, microphone, or the like. User interface 206 can also include one or more user output devices, such as indicator lights, speakers, headphone jacks or the like, together with supporting electronics (e.g., digital-to-analog or analog-to-digital converters, signal processors or the like). A user can operate the various input controls of user input interface 206 to invoke the functionality of PCD 200 and can view and/or hear output from PCD 200.

Accessory I/O interface 208 can allow PCD 200 to communicate with various accessories, e.g., USB accessory 110. For example, accessory I/O interface 208 can support connections to a remote control unit, an external camera, an external speaker accessory, an external video device, or the like. In some embodiments, accessory I/O interface 208 includes a 30-pin connector similar to the connector used on iPod® products manufactured and sold by Apple Inc. Alternatively or additionally, accessory I/O interface 208 can include a different connector, e.g., USB, and/or wireless interface (e.g., Bluetooth or the like). In some embodiments, accessory I/O interface 208 can include more than one connector.

Network interface 210 can allow PCD 200 to communicate with other devices on a network and exchange information with the other devices. In some embodiments network interface 210 can include radio frequency (RF) transceiver components for accessing wireless voice and/or data networks (e.g., using cellular telephone technology, advanced data network technology such as 3G or EDGE, Wi-Fi (IEEE 802.11 family standards), or other mobile communication technologies, or any combination thereof), GPS receiver components, and/or other components. In some embodiments network interface 210 can provide wired network connectivity (e.g., Ethernet) in addition to or instead of a wireless interface. Network interface 210 can be implemented using a combination of hardware (e.g., antennas, modulators/demodulators, encoders/decoders, and other analog and/or digital signal processing circuits) and software components.

Figure 3:
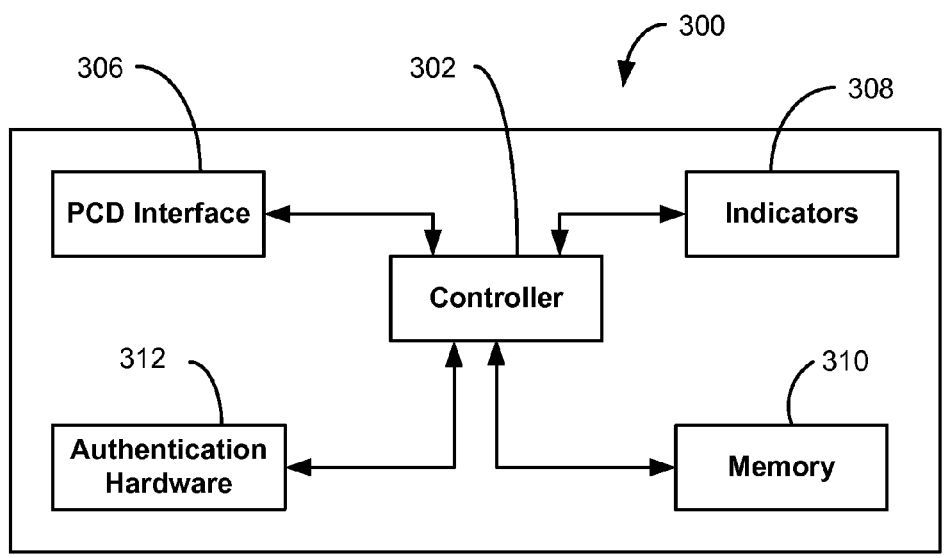
FIG. 3 is a block diagram of an accessory according to an embodiment of the present invention.

FIG. 3 is a block diagram of a USB accessory 300 according to an embodiment of the present invention (e.g., implementing accessory 110 of FIG. 1). USB accessory 300 can include a controller 302, a PCD interface 306, one or more indicator devices 308, a memory 310, and authentication hardware 312.

Controller 302, which can be implemented as one or more integrated circuits (e.g., a conventional microprocessor or microcontroller), can control the operation of USB accessory 300. For example, controller 302 can manage the communications between USB accessory 300 and a PCD connected to the USB accessory 300 via PCD interface 306. In some embodiments, controller 302 can be part of control circuitry designed to control the operation of USB accessory 300.

PCD interface 306 can allow USB accessory 300 to communicate with a PCD. As described above, a PCD can be a media player, a personal digital assistant, a portable computer, or the like. In some embodiments, PCD interface 306 can include a USB connector.

Indicator devices 308 can include one or more illuminating devices, e.g., light emitting diodes (LED), or audio devices. Indicator devices 308 can visually or audibly communicate status information about the keyboard accessory to the user. For example, indicator devices 308 can include an LED to indicate PCD connection status. In some embodiments, the LED can be illuminated whenever a PCD is connected to the USB accessory. In some embodiments, indicator devices 308 may also include a speaker for delivering audio such as beeps, spoken words, etc. to indicate status of the USB accessory and/or the PCD. In some embodiments, indicator devices 308 can also provide audio output based on signals received from the PCD.

Memory 310 can be implemented, e.g., using disk, flash memory, or any other nonvolatile storage medium. In some embodiments, memory 310 can store the firmware for the USB accessory. In some embodiments, memory 310 can store information about various interfaces supported by the USB accessory. In this instance, when the USB accessory is connected to the PCD, the USB accessory can communicate information about the various interfaces supported by the USB accessory.

Authentication hardware 312, which can be implemented as one or more integrated circuits e.g., an ASIC device, is configured to exchange data with the PCD during the authentication process. In some embodiments, authentication hardware can include information that enables the PCD to verify whether the accessory is authorized to be used with the PCD prior to enabling the accessory for use with the PCD. As described above, authentication hardware need not be always located in accessory 300. In some embodiments, authentication hardware can be located in the cable that connects the accessory to the PCD.

Connectors at the various interfaces can be complementary or not as desired. Where two connectors are not complementary, an adapter can be provided to connect the two devices. Further, in some embodiments, some of the connections can be wireless, and connectors can be omitted where wireless interfaces are provided.

Further, while the PCD and the USB accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of devices including electronic devices implemented using any combination of circuitry and software.

In one set of embodiments, the PCD and the accessory can communicate by exchanging commands and data according to a communication protocol. An example of such a protocol is the (Pod® Accessory Protocol (iAP) developed by Apple Inc. According to one aspect, the protocol can define a format for messages transmitted between the PCD and the accessory. For instance, the protocol can specify that each message is sent in a packet with a header and an optional payload. The header can provide basic information such as a start indicator, length of the packet, and a command to be processed by the recipient. The payload can provide data associated with the command. In some embodiments, the amount of associated data can be different for different commands, and some commands can provide for variable-length payloads.

In some embodiments, the protocol can include a "general" lingo that enables certain core communication functions between the PCD and the USB accessory. The general lingo can include commands enabling the PCD and the USB accessory to identify themselves to each other and to provide general information about their respective capabilities, including which interfaces each supports. The general lingo can also include authentication commands that the PCD can use to verify the purported identity and capabilities of the USB accessory or any other accessory (or vice versa), and the USB accessory can be blocked from being operational if the authentication is unsuccessful.

As described above, in a conventional USB connection scenario, the host device does not perform any authentication of the USB accessory device prior to loading the appropriate drivers to make the USB accessory device operational. Embodiments of the this invention provide techniques for authenticating a USB accessory device before any of the drivers for that device are loaded and the interfaces are operational. This ensures that only authorized USB accessory devices can work with the PCD thus reducing the possibility of the USB accessory device seriously and/or permanently damaging the PCD.

Figure 4:
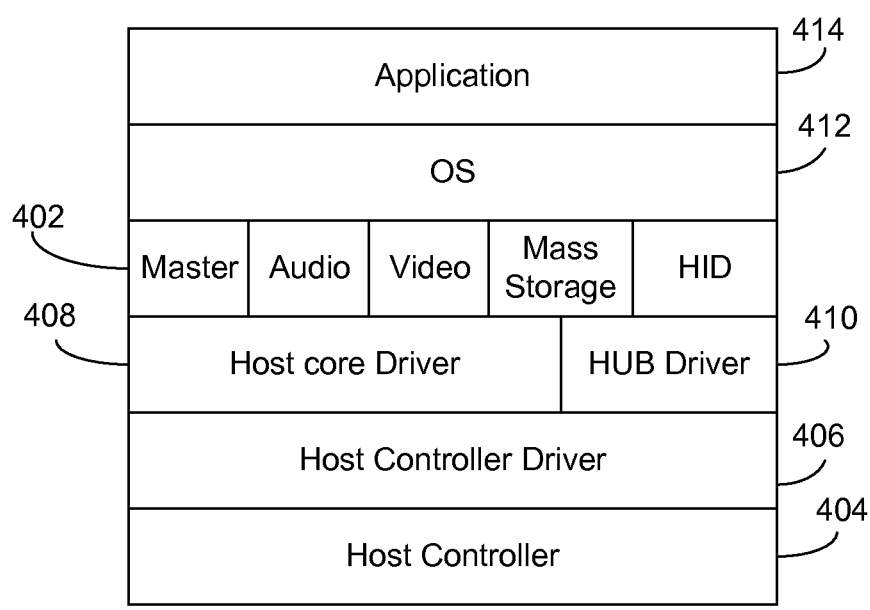
FIG. 4 illustrates a modified USB host stack according to an embodiment of the present invention.

The USB communication protocol does not have a built-in functionality for performing an authentication of the connected USB accessory. In order to provide the authentication capability, a new master interface can be defined for the USB stack for the PCD (host). FIG. 4 illustrates a block diagram of a modified USB host stack 400 that can include a custom master interface 402. USB stack 400 can include a host controller 404 that can provide an interface for connecting a USB device to the USB host. A USB host can have multiple host controllers and each host controller may provide one or more USB ports. A USB host controller driver 406 and host core driver 408 can be used by USB host controller 404 to communicate with a USB accessory device. In some embodiments, the driver software can be part of an operating system of a USB host device, but may also be implemented by application-specific devices such as a microcontroller. USB hub driver 410 can enable a USB hub to communicate with a USB device connected to the USB hub. In general, a USB hub is a device that can expand a single USB port into several so that there are more ports available to connect devices to a host system. The audio, video, HID, and mass storage are some of the interfaces that can be supported by a USB accessory device. The operating system 412 and application 414 can be part of the USB host device. Standard implementations of USB host stack components can be used, e.g., implementations compliant with "Universal Serial Bus Specification", version 2.0 dated Apr. 27, 2000.

The accessory device can be configured to enumerate the master interface in addition to other standard USB interfaces such as mass storage, HID, etc. In addition, the accessory device can also include support for the general lingo of the PCD communication protocol, which can be used for authentication. As described above, the accessory can include a custom ASIC that supports authentication and the associated authentication protocol for exchanging commands and data with the host device, e.g., PCD.

As described above, the USB standard provides various standard interfaces for accessory devices. In a conventional USB communication scenario, when a USB accessory is connected to a host device, the USB accessory enumerates the various interfaces supported by the accessory to the host and host in turn loads the appropriate drivers for use with the USB accessory. In some embodiments of the present invention, the "master" interface can be defined for all USB accessories that are designed to be used with the PCD. Master interface 400 can be used as a vehicle to authenticate the USB accessory before the USB accessory is made operational for use with the PCD. The master interface can have certain attributes associated with it. For example, some of the attributes associated with the master interface 402 can be interface class, interface sub-class, interface protocol, and a string name associated with the master interface. Each of these attributes can have a specific value associated with it. For example, the interface class can have a value of 255, the interface sub-class can have a value of 0, the interface protocol can have a value of 0, and the interface string can have a value of "protocol interface" associated with it.

When a USB accessory is connected to the PCD, the USB accessory can enumerate all of its interfaces to the PCD. However, at this point the PCD does not enable any of the interfaces enumerated by the USB accessory. The PCD can first determine whether the USB accessory supports the master interface. Specifically, the PCD can search all the interfaces enumerated by the USB accessory to verify whether the attributes associated with the master interface are provided by the USB accessory. In some embodiments, the PCD can look for the values associated with each of the attributes of the master interface to determine whether the attributes associated with the master interface are provided by the USB accessory. If the PCD does not find all the attributes associated with the master interface during its search of the various interfaces enumerated by the USB device, the USB accessory can be blocked from any further communication with the PCD.

If the PCD determines that the USB accessory supports the master interface, i.e. the accessory includes all the attributes with the correct values associated with the master interface, the PCD can communicate with the USB accessory using commands of the general lingo, to authenticate the USB accessory. In some embodiments, the USB accessory and the PCD can communicate with each other by sending and receiving information packets that include authentication commands, once the PCD determines that the USB accessory device supports the master interface. Once authenticated, the PCD can enable one or more interfaces supported by the USB accessory device using a standard USB enumeration process.

Figure 5:
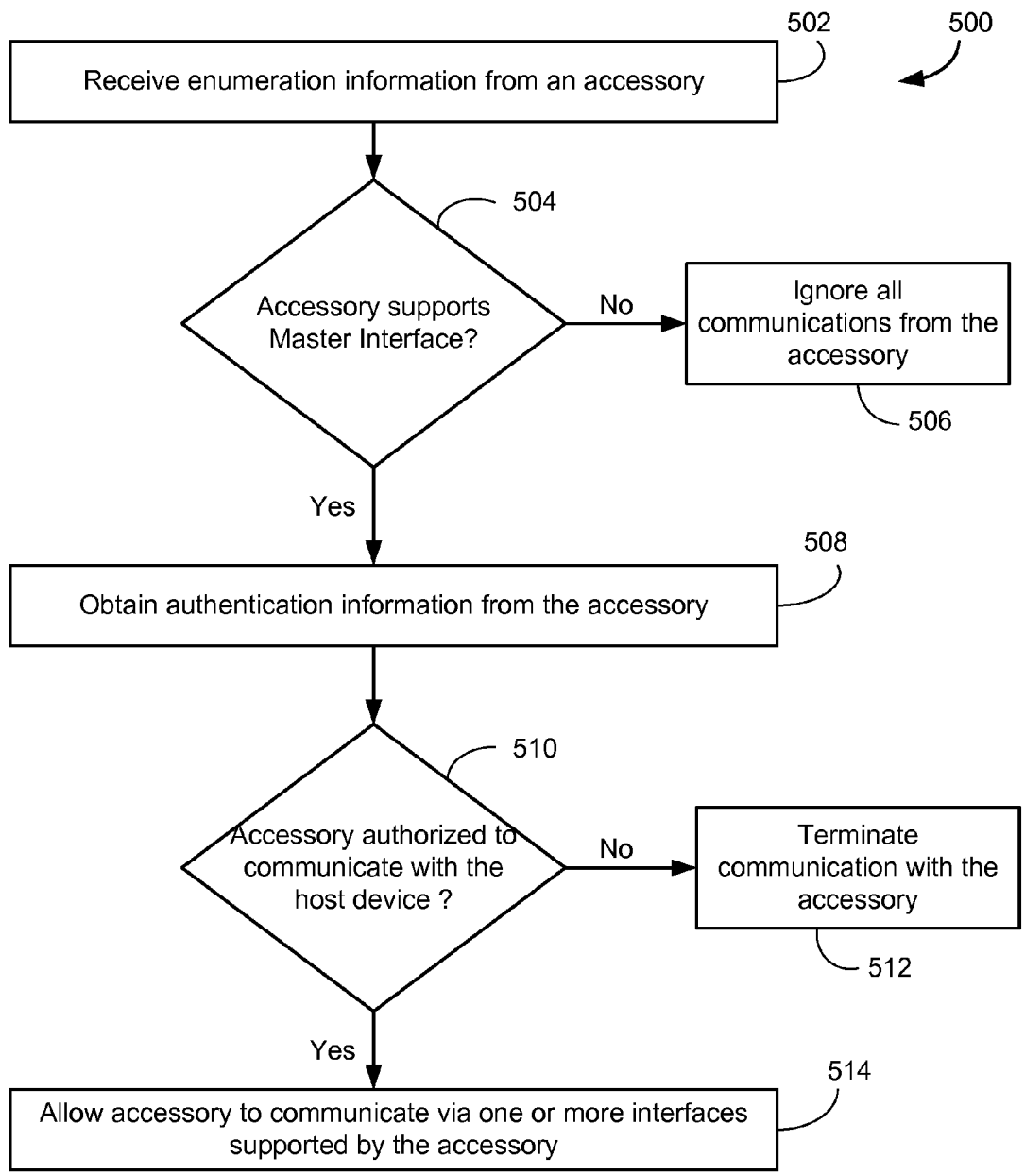
FIG. 5 is a flow diagram of a process for using an accessory according to an embodiment of the present invention.

As described above, when a USB accessory device is connected to the PCD, the PCD can first authenticate the USB accessory device prior to enabling any of the functionalities of the USB accessory device. FIG. 5 is a flow diagram of a process 500 for connecting a USB accessory device to a host according to an embodiment of the present invention. Process 500 can be performed by e.g., PCD 100 of FIG. 1.

At block 502, the PCD can receive enumeration information from the accessory. The enumeration information can include among other things, information about the various interfaces supported by the accessory (e.g., audio, mass storage, etc.). At block 504, the PCD can verify whether the accessory supports the master interface. If it is determined at block 504 that the accessory does not support the master interface, all further communications from the accessory can be ignored (506) and the accessory is not activated for use with the PCD. In the event that the accessory supports the master interface, the PCD can communicate with the accessory to obtain authentication information from the accessory at block 508. Based on the authentication information received from the accessory, the PCD can determine whether the accessory is authorized to be used with the PCD, at block 510. If it is determined that the accessory is not authorized, i.e. the authentication process is unsuccessful, all communications with the accessory can be terminated at block 512 and optionally a error message may be displayed on the PCD and/or the accessory. If the authentication is successful, the PCD can load the appropriate device drivers to enable the one or more other interfaces supported by the accessory at block 514.

It should be appreciated that process 500 is illustrative and that variations and modifications are possible. In addition, steps described as sequential may be executed in parallel, order of steps may be varied, and steps may be modified, combined, added, or omitted. One of ordinary skill in the art will recognize many variations, modifications, and alternatives.

Figure 6:
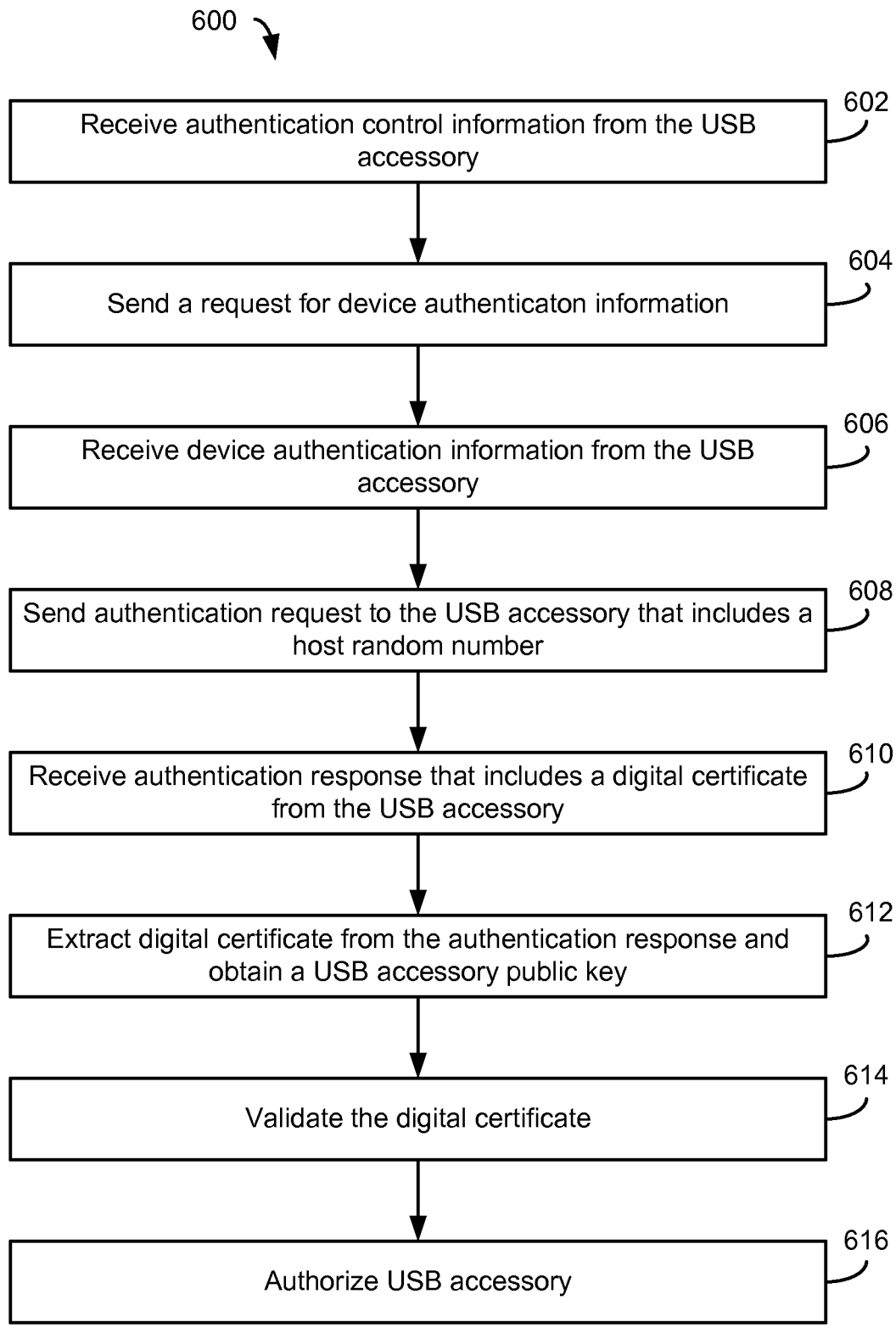
FIG. 6 is a flow diagram of a process for authenticating a USB accessory according to an embodiment of the present invention.

As described above, a USB accessory can be authenticated before it can be used with the PCD. In am embodiment, once it is determined that the USB accessory device supports the master interface, the PCD can then determine whether the USB accessory is authorized to be used with the PCD using an authentication process, e.g., blocks 508 and 510 of FIG. 5. There are several techniques that can be used for authenticating the USB accessory device. Details of techniques that can be used for authenticating an accessory are disclosed in commonly-owned and co-pending U.S. patent application Ser. No. 11/476,999 filed on Jun. 27, 2006 and Ser. No. 11/051,499 filed on Feb. 3, 2005, the contents of which are incorporated by reference herein in their entirety for all purposes. FIG. 6 is a flow diagram of a process 600 for authenticating a USB accessory according to an embodiment of the present invention. Process 600 can be performed by, e.g., PCD 100 of FIG. 1. Process 600 can begin after the PCD has confirmed that the USB accessory supports a master interface.

At block 602 the PCD can receive authentication control information from the USB accessory device via the master interface. As an example, the authentication control information can include information about the type of accessory device, whether authentication is supported, when to authenticate, and/or power requirement of the accessory device. In some embodiments, the authentication status of the USB accessory device is cleared on its own initiative or in response to a command or acknowledgement from the PCD after receipt of the authentication control information. In this instance, the USB accessory device maintains the authentication status. Here, by clearing the authentication status, whenever an USB accessory device is connected, the USB accessory device can understand that it must be authenticated with the PCD.

At block 604, the PCD can send a request for device authentication information to the USB accessory. The device authentication information request serves to request certain information from the USB accessory device that will be utilized by the PCD during the authentication process. At block 606, the PCD can receive device authentication information from the USB accessory device. For example, the device authentication information can include a device identifier and a version indicator. The device identifier can pertain to a vendor identifier, a product identifier, or both. The version indicator can pertain to a version of the master interface protocol that is supported.

At block 608, the PCD can send an authentication request to the USB accessory. In some embodiments, the authentication request can include a host random number, which can be used in the authentication process. At block 610 the PCD can receive an authentication response from the USB accessory device. In some embodiments, the authentication response can include a digital signature generated from the host random number. At block 612, the PCD can identify a digital certificate for the accessory based on the authentication information and can obtain a public key for the USB accessory device based on the digital certificate. In one embodiment, the PCD can have multiple public keys or digital certificates that are associated with different device identifiers. In some embodiments, the device identifier can be used to obtain the public key for the USB accessory device. At block 614, the PCD can validate the digital signature using the public key.

If the digital signature is validated, the USB accessory device is deemed authorized at block 616. Command access permissions associated with the USB accessory device can be updated to permit the USB accessory device to use those commands and associated functions. If the digital signature is not validated, the USB accessory is deemed to be unauthorized for use with the PCD and a message indicating the same can be communicated either to the PCD and/or on the USB accessory.

It should be appreciated that process 600 is illustrative and that variations and modifications are possible. In addition, steps described as sequential may be executed in parallel, order of steps may be varied, and steps may be modified, combined, added, or omitted. One of ordinary skill in the art will recognize many variations, modifications, and alternatives.

In some embodiments, the authentication can result in all of the interfaces supported by the USB device being enabled for use with the PCD. In other embodiments, the authentication may result in only the allowed interface of the USB accessory being enabled. For example, a USB accessory may support multiple interfaces such as mass storage, video, and audio, however, only the mass storage interface may be authorized for use with the PCD. In this instance, even if the USB accessory is successfully authenticated, the authentication process can result in only the mass storage interface being enabled for use with the PCD while the other interface is disabled or blocked from being usable. Thus, the authentication can have various 'levels' or 'tiers' where each level of authentication can unlock certain interfaces/functions of the USB accessory device while keeping other interface/functions locked.

While the invention has been described with respect to specific embodiments, one skilled in the art will recognize that numerous modifications are possible. In some embodiments, circuits, processors, and/or other components of a PCD and/or accessory may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on. Further, while the embodiments described above may make reference to specific hardware and software components, those skilled in the art will appreciate that different combinations of hardware and/or software components may also be used and that particular operations described as being implemented in hardware can also be implemented in software or vice versa.

Computer programs incorporating some or all features described herein may be encoded on various machine-readable non-transitory storage media. Suitable media include magnetic disk (including hard disk) or tape, optical storage media such as compact disk (CD) or DVD (digital versatile disk), flash memory, and the like. Machine-readable storage media encoded with the program code may be packaged with a compatible device or provided separately from other devices. In addition, program code may be encoded and transmitted via wired, optical, and/or wireless networks conforming to a variety of protocols, including the Internet, thereby allowing distribution, e.g., via Internet download.

Thus, although the invention has been described with respect to specific embodiments, it will be appreciated that the invention is intended to cover all modifications and equivalents within the scope of the following claims.

What is claimed is:

1. A method of operating a host device, the method comprising, by the host device:
   receiving from an universal serial bus (USB) accessory device coupled to the host device, enumeration information identifying a plurality of interfaces supported by the USB accessory device, the plurality of interfaces including a master interface that has one or more associated attributes, each attribute having a predetermined value, wherein the master interface is defined for USB accessories designed to be used with the host device;
   determining that the enumeration information indicates presence of the predetermined value for each of the one or more attributes associated with the master interface;
   obtaining authentication information from the USB accessory device in accordance with a protocol associated with the master interface, the authentication information including a digital certificate;
   extracting the digital certificate from the authentication information;
   validating the digital certificate;
   enabling the USB accessory device for use with the host device based on the validation;
   determining an authorization level for the USB accessory device;
   determining one or more interfaces, from the plurality of interfaces, associated with the authorization level;
   enabling only the one or more interfaces; and
   permitting communication with the USB accessory device using only the one or more interfaces.

2. The method of claim 1 wherein, in the event that the plurality of interfaces does not include the master interface, ignoring subsequent communication from the accessory device.

3. The method of claim 1 further comprising: if it is determined that the accessory device does not support the master interface, ignoring subsequent communication from the accessory device.

4. The method of claim 1 wherein the plurality of attributes include an interface class, an interface sub-class, an interface protocol, and an interface string identifier.

5. The method of claim 1 further comprising:
verifying that the enumeration information includes the plurality of attributes associated with the master interface; and
verifying whether each of the plurality of attributes has the predetermined value.

6. The method of claim 1 wherein, receiving the enumeration information comprises receiving the enumeration information via a transport, the transport comprising a Universal Serial Bus (USB) communication protocol.

7. The method of claim 6 wherein, the transport comprises a Bluetooth communication protocol.

8. A computer-readable non-transitory storage medium storing a plurality of instructions that when executed by a processor in a host device, cause the processor to perform a method for authenticating an accessory device, the method comprising:
receiving, from the accessory device, enumeration information for a plurality of interfaces of the accessory device, the plurality of interfaces including a master interface;
determining that the enumeration information includes identification information for the master interface; the identification information including one or more predetermined values for one or more attributes associated with the master interface, wherein the master interface is defined for accessory devices designed to be used with the host device;
obtaining authentication information from the accessory device in accordance with a protocol associated with the master interface;
extracting a digital certificate from the authentication information;
validating the digital certificate;
enabling the accessory device for use with the host device based on validation;
determining an authorization level for the accessory device from a plurality of authorization levels, each authorization level in the plurality of authorization levels being associated with a subset of interfaces from the plurality of interfaces;
determining one or more interfaces, from the plurality of interfaces, to be enabled based on the authorization level of the accessory device;
enabling the one or more interfaces; and
permitting communication with the accessory device using only the enabled one or more interfaces, wherein the one or more interfaces includes at least one interface other than the master interface.

9. The computer-readable non-transitory storage medium of claim 8 further comprising:
obtaining a public key associated with the accessory device; and
validating the digital certificate using the public key.

10. The computer-readable non-transitory storage medium of claim 8 wherein the one or more attributes include an interface class, an interface sub-class, an interface protocol, or a string name associated with the master interface.

11. The computer-readable non-transitory storage medium of claim 8 wherein the plurality of interfaces comprises a set of interfaces supported by the host device but are not enabled for use with the host device based on the authorization level.

12. A host device comprising:
a processor; and
a memory device coupled to the processor,
wherein the processor is configured to:
receive from an universal serial bus (USB) accessory device coupled to the host device, enumeration information identifying a plurality of interfaces supported by the USB accessory device, the plurality of interfaces including a master interface that has one or more associated attributes, each attribute having a predetermined value, wherein the master interface is defined for USB accessories designed to be used with the host device;
determine that the enumeration information indicates presence of the predetermined value for each of the one or more attributes associated with the master interface;
obtain authentication information from the USB accessory device in accordance with a protocol associated with the master interface, wherein the authentication information includes a digital certificate;
extract the digital certificate from the authentication information;
validate the digital certificate;
enable the USB accessory device for use with the host device based on the validation;
determine an authorization level for the USB accessory device;
determine one or more interfaces, from the plurality of interfaces, associated with the authorization level;
enable only the one or more interfaces; and
permit communication with the USB accessory device using only the one or more interfaces.

13. The host device of claim 12 wherein the one or more attributes comprises an interface class, an interface sub-class, an interface protocol, or a string name associated with the master interface.

14. The hose device of claim 12 wherein plurality of interfaces supported by the USB accessory device include a set of interfaces that are not enabled for use with the USB accessory device based on the authorization level of the USB accessory device.

15. A method for operating an universal serial bus (USB) accessory device, the method comprising:
providing, to a host device, (i) a list of one or more interfaces supported by the accessory device and (ii) information about a master interface supported by the accessory device, the master interface having a plurality of attributes associated with it and wherein each of the plurality of attributes has a predetermined value, wherein the master interface is defined for any accessory that is designed to be used with the host device;
providing, to the host device, the predetermined value for each attribute associated with the master interface;
receiving a request from the host device to provide authentication information via a protocol associated with the master interface;
providing the authentication information, using the protocol, in response to the request from the host device, wherein the authentication information includes a digital certificate;
receiving an authentication confirmation message from the host device and information indicating enablement of a first interface from the one or more interfaces, wherein the first interface is enabled based on an authorization level of the accessory device, wherein the authorization level is part of a plurality of authorization levels and wherein each authorization level in the plurality of authorization levels has a set of interfaces associated with it; and communicating with the host device using only the first interface.

16. The method of claim 15 wherein the USB accessory device communicates with the host device using a communication protocol associated with the master interface.

17. The method of claim 15 wherein the request for providing the authentication information includes a random number generated by the host device.

18. The method of claim 15 wherein the authentication information comprises one of a device identifier or a version indicator.

19. The method of claim 15 wherein the list of one or more interfaces is provided as part of a USB enumeration process.

* * * * *